United States Patent [19]
Ayres

[11] 3,915,006
[45] Oct. 28, 1975

[54] MAGNETIC CLINICAL THERMOMETER
[75] Inventor: Waldemar A. Ayres, Rutherford, N.J.
[73] Assignee: Becton, Dickinson and Company, East Rutherford, N.J.
[22] Filed: Feb. 27, 1974
[21] Appl. No.: 446,377

[52] U.S. Cl. .................................................. 73/371
[51] Int. Cl.² ............................................ G01K 5/22
[58] Field of Search .......... 73/371, 373, 368, 368.2; 335/219; 116/114.5; 138/37

[56] References Cited
UNITED STATES PATENTS
| | | | |
|---|---|---|---|
| 2,712,237 | 7/1955 | Margolis | 73/371 |
| 3,302,448 | 2/1967 | Mocker | 73/23 |
| 3,675,501 | 7/1972 | De Kanter | 116/114.5 |
| 3,688,582 | 9/1972 | Gradishar | 73/371 |

*Primary Examiner*—Charles A. Ruehl
*Attorney, Agent, or Firm*—Kane, Dalsimer, Kane, Sullivan and Kurucz

[57] ABSTRACT

An improved clinical thermometer is provided comprising an elongated tube of transparent material having closed top and bottom ends. A magnet is disposed adjacent the bore of the tube interposed between the ends dividing the tube into a first portion and a second portion. A magnetic fluid reservoir is defined in the tube first portion communicating with the bore and temperature indicating indicia is arranged alongside the tube second portion. A thermally expansible magnetic fluid of the type that experiences an increase in thixotropy or viscosity under the influence of the magnetic field is disposed in the reservoir.

6 Claims, 1 Drawing Figure

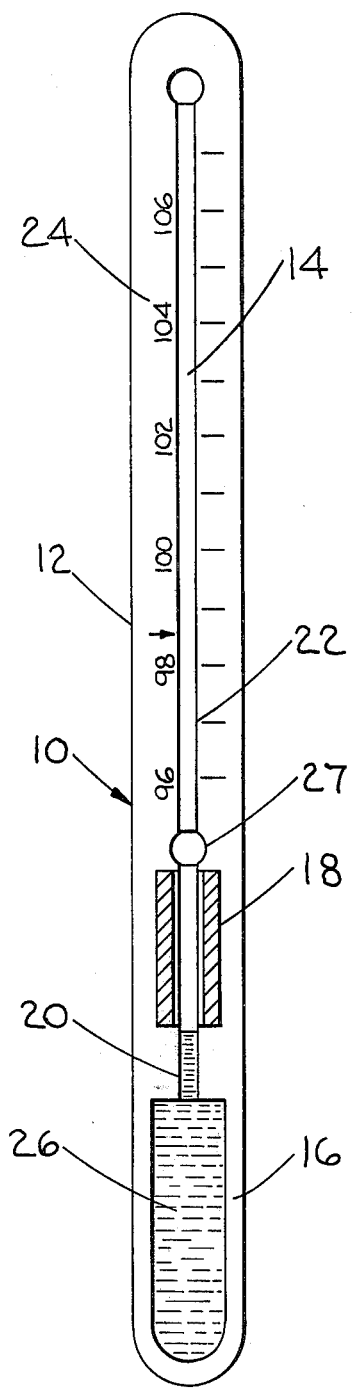

MAGNETIC CLINICAL THERMOMETER

BACKGROUND OF THE DISCLOSURE

The present invention relates to thermometers and more particularly to a nonmercury clinical thermometer.

For years, the standard clinical thermometer has comprised a glass tube having a constricted lumen in which a column of mercury could expand under heating. Difficulties associated with reading and "shaking down" such thermometers are well known. Further, the constituent materials of such thermometers, namely glass and mercury, are inherently dangerous requiring that thermometers be shipped, stored and used with considerable care. In addition, the manufacture of such mercury thermometers is a relatively costly and time consuming procedure which is reflected in the final cost of the product.

On the other hand, mercury-glass clinical thermometers have many advantages which justify their present extensive usage. They provide accurate temperature indication readings and hold a maximum reading; they can be centrifuged or shaken down to permit reuse innumerable times; and they require no special refrigeration prior to use. In addition, the manner of reading such thermometers, while possibly difficult to some, has become accepted and medical technicians and personnel are familiar with and comfortable with such devices.

In view of the above, it is the principal object of the present invention to provide an improved clinical thermometer which retains all the advantages of present thermometers without the disadvantages inherent in the use of glass-mercury thermometers.

Further objects are to provide a thermometer which is easier to read than the usual mercury thermometer and which would be adaptable to quantity production at reduced manufacturing costs and with relatively inexpensive materials.

SUMMARY OF THE INVENTION

The above and other beneficial objects and advantages are attained in accordance with the present invention by providing an improved clinical thermometer comprising an elongated, evacuated tube of transparent material having closed top and bottom ends. A magnet is disposed adjacent the bore of the tube interposed between the ends dividing the tube into a first portion and a second portion. A magnetic fluid reservoir is defined in the tube first portion communciating with the bore and temperature indicating indicia in the form of a scale is arranged alongside the tube second portion. A thermally expansible magnetic fluid of the type that experiences an increase in thixotropy or viscosity under the influence of the magnetic field is disposed in the reservoir.

BRIEF DESCRIPTION OF THE DRAWING

The accompanying drawing is a schematic top plan representation of a thermometer in accordance with the present invention.

DETAILED DESCRIPTION OF THE PREFERRED EMBODIMENT

In the field of electromagnetic clutches, brakes and the like, magnetic liquids are employed which have the property of having a comparatively low viscosity or thixotropy in the absence of a magnetic field which changes to a high viscosity or thixotropy in the presence of a magnetic field. It is this change of viscosity or thixotropy which enables the driving plates of the device to transmit rotary motion to the driven plates when the magnetic field is turned on.

Generally speaking, magnetic fluids of the type described comprise a mixture of a liquid component and a solid component, the solid component being very finely divided particles of a magnetizable solid. The solid may be iron, a compound of iron, or other appropriate magnetic responsive material.

In accordance with the present invention, a thermometer 10 is provided in the form of an elongated tubular body 12 closed at its top and bottom ends. A capillary bore 14 extends along the thermometer terminating at its bottom end in an enlarged reservoir or bulb 16.

A hollow cylindrical magnet 18 is disposed within the tube adjacent the bore separating the bore into a first portion 20 and second portion 22. Temperature indication markings 24 spanning a range of from 96°F–106°F are laid out along the second portion of the thermometer as shown, or centigrade or any other preferred scale may be used.

Contained within the reservoir 16 is a magnetic liquid 26 of the type previously described. The fluid component of the liquid may comprise any of many inert liquids but preferably is one having a large coefficient of cubical expansion. Possible suitable liquids are set forth in the following table. As a basis for comparison, the coefficient for water is 0.207 which, it should be noted, is greater than that of mercury.

| Liquid | Coefficient of Cubical Expansion at 20°C × 10³ |
|---|---|
| Mercury | 0.181 |
| Acetic acid | 1.071 |
| Acetone | 1.487 |
| Methyl alcohol | 1.199 |
| Benzene | 1.237 |
| Carbon disulphide | 1.218 |
| Carbon tetrachloride | 1.236 |
| Chloroform | 1.273 |
| Ether | 1.656 |
| Pentane | 1.608 |
| (Water | 0.207) |

It is to be noted that each of the fluids set forth above has a coefficient considerably greater than that of mercury. For example, the coefficient of pentane is 788 percent greater than mercury. This would permit an enlarged capillary bore 14 relative to the reservoir or bulb 16 as compared to the corresponding parts of a conventional mercury-glass thermometer.

If desired, a colorant (dye or pigment) may be added to the magnetic liquid to increase the ease of reading the thermometer.

In operation, when the sensing bulb or reservoir 16 is exposed to an increased temperature by insertion in a patient orally or rectally, the magnetic fluid expands and, in so doing, rises in the capillary to a point adjacent the scale indicative of the temperature to which the bulb was exposed. In so expanding, the fluid flows by magnet 18 and on up the capillary overpowering the increased viscosity at the magnet.

When the thermometer is removed from the patient, the magnetic liquid in the bulb contracts and the cohesive forces in the liquid column, tending to maintain a continuous column, tend to cause the liquid to move downwardly toward the reservoir. However, these forces are quite small and the markedly increased thixotropy of the magnetic liquid in the vicinity of the magnet provides much greater frictional drag forces so that the liquid column breaks between the magnet and the reservoir with that portion of the column above the magnet maintained in the position it had previously attained thereby providing the desired "maximum reading."

If, at some later time, it is desirable to reuse the thermometer, the thermometer may be "shaken down" or "centrifuged down" in a manner similar to that employed with conventional mercury thermometers until all the liquid is below fever temperature relative to the scale.

The magnet 18 may be formed of any suitable material such as hard steel, iron or cobalt alloys such as Alnico, ceramic magnets, plastic magnets, etc. Further, the shape of the magnet is relatively immaterial so long as the magnet is capable of creating and maintaining its magnetic field and producing substantial increase of viscosity or thixotropy of adjacent magnetizable liquid.

It is to be understood that both the terms "viscosity" or "thixotropy" are used in this application in referring to the change of resistance to flow of magnetizable liquids in the presence of a magnetic field such as utilized in fluid magnetic clutches and brakes and as utilized in this thermometer invention.

As an optional modification, a slightly enlarged chamber 27 in the capillary bore 14 may be provided closely adjacent magnet 18. The purpose of this is to provide additional assurance that the magnetizable liquid will hold the maximum reading. For the liquid to flow downwardly, the high viscosity liquid in chamber 27 would have to neck down to the very much smaller bore of the capillary 14 below chamber 27. The viscous liquid in chamber 27 may be thought of as acting very much as a plug, substantially resisting down flow.

Thus, in accordance with the above, the aforementioned objectives are effectively attained.

Having thus described the invention, what is claimed is:

1. A thermometer comprising: an elongated tube of transparent material having a bore defined by a bottom end and a closed top end; a magnet disposed adjacent said bore interposed between said ends, said magnet separating said tube into a first portion and a second portion; a magnetic fluid reservoir in said tube first portion communicating with said bottom end of said bore; temperature indicating indicia arranged along said tube second portion; and a thermally expansible magnetic fluid disposed in said reservoir and in part of said bore, said fluid being of the type that experiences an increase in thixotropy or viscosity under the influence of a magnetic field.

2. The thermometer in accordance with claim 1 wherein said tube second portion comprises a capillary tube.

3. The thermometer in accordance with claim 2 including an enlarged chamber portion of the capillary located closely adjacent to said magnet.

4. The thermometer in accordance with claim 1 wherein said magnet comprises a cylindrical hollow member disposed about said bore.

5. The thermometer in accordance with claim 1 wherein said fluid reservoir comprises a bulb section having a diameter greater than that of said bore.

6. The thermometer in accordance with claim 1 wherein a colorant is added to said magnetic fluid.

* * * * *